United States Patent
Xu et al.

(10) Patent No.: US 7,182,613 B2
(45) Date of Patent: Feb. 27, 2007

(54) CARD CONNECTOR

(75) Inventors: Jian-Bo Xu, Kunsan (CN); Ren-Chih Li, Tu-chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 31 days.

(21) Appl. No.: 11/169,533

(22) Filed: Jun. 28, 2005

(65) Prior Publication Data

US 2006/0134954 A1    Jun. 22, 2006

(30) Foreign Application Priority Data

Dec. 21, 2004    (CN) .......................... 2004 2 0055064

(51) Int. Cl.
*H01R 13/62* (2006.01)

(52) U.S. Cl. .................................................. 439/159

(58) Field of Classification Search ........ 439/157–160, 439/630
See application file for complete search history.

(56) References Cited

U.S. PATENT DOCUMENTS

| | | | |
|---|---|---|---|
| 6,537,090 B2 * | 3/2003 | Ozawa | 439/159 |
| 6,776,632 B2 | 8/2004 | Kikuchi et al. | |
| 6,776,640 B2 * | 8/2004 | Nishioka | 439/159 |
| 6,790,061 B1 * | 9/2004 | Lai et al. | 439/159 |
| 6,934,159 B2 * | 8/2005 | Nogami | 361/726 |

* cited by examiner

*Primary Examiner*—Briggitte R. Hammond
(74) *Attorney, Agent, or Firm*—Wei Te Chung

(57) ABSTRACT

A card connector includes an insulating housing (10), a number of contacts (20), an ejector and an engaging portion (123). The insulating housing (10) defines a card receiving space (14) with a card insertion/ejection direction. The ejector disposed in the insulating housing comprises a slider (40) moving along the card insertion/ejection direction with a card inserted/ejected, holding means to securely hold the slider in a final position where a card is electrically connected with the contacts and to release the slider from the final position when ejecting the card, and a locking member (42) disposed in the slider to be moveable in or out of the card receiving space. The engaging portion (123) is disposed in the housing and the engaging portion (123) cooperating with the locking member (42) to securely lock the card in the final position.

14 Claims, 6 Drawing Sheets

CARD CONNECTOR

BACKGROUND OF THE INVENTION

1. Field of the Invention

The present invention is generally related to a card connector, and especially to a card connector which is used for consuming conducts such as digital cameras or the like.

2. Description of Related Art

Usually, consuming conducts, such as portable telephones, PDA (Personal Digital Assistance) and the like, need electrical cards to enlarge and enhance functions thereof. Therefore, a plurality of card connectors adapted for receiving the corresponding cards are designed to accomplish requirements between the consuming products and the electrical cards. Commonly, the card connectors often have ejectors to eject the corresponding cards out therefrom and locking arms to hold the cards on a normal working state.

U.S. Pat. No. 6,776,632 discloses a card connector comprising an insulating housing defining a card receiving space and an ejector for eject a card received therein. The ejector has a slider, a coil spring, an ejecting bar integrated with the slider and a locking member disposed in the slider. The locking member moves with the slider along a card insertion/ejection direction and moveably protrudes into the card receiving space for holding the card in a final position where the card is electrically connected with the card connector. However, the locking member is freely and moveably locked in a notch formed in the card when the card is in the final position. Namely, there is no additional means to retain the locking member securely into the notch of the card. Thus, when the card is in the final position and drawn out from the card connector not by the ejector but an outer force by mistake, the card will urge the locking member to rotate outward to release the card. In such situation, it is bound to destroy the card and the card connector.

Hence, an improved card connector is highly desired to overcome the aforementioned disadvantages of the prior art.

SUMMARY OF THE INVENTION

Accordingly, an object of the present invention is to provide a card connector which can prevent a card received therein from being pulling out by mistake in a normal working state.

To achieve the above object, a card connector for receiving a card comprises an insulating housing, a plurality of contacts, an ejector and an engaging portion. The insulating housing defines a card receiving space with a card insertion/ejection direction. The contacts are retained in the insulating housing and exposed into the card receiving space. The ejector disposed in the insulating housing comprises a slider moving along the card insertion/ejection direction with a card inserted/ejected, a holding means to securely hold the slider in a final position where a card is electrically connected with the contacts and to release the slider from the final position when ejecting the card, and a locking member disposed in the slider to be moveable in or out of the card receiving space. The engaging portion is disposed in the housing adjacent to the slider of the ejector and the engaging portion cooperating with the locking member to securely lock the card in the final position.

Other objects, advantages and novel features of the present invention will be drawn from the following detailed description of a preferred embodiment of the present invention with attached drawings.

DETAILED DESCRIPTION OF THE INVENTION

Reference will now be made in detail to the preferred embodiment of the present invention.

Referring to FIGS. 1 to 6, the card connector in accordance with the present invention is adapted for receiving a card 80. The card connector comprises an insulating housing 10, a plurality of contacts 20 received in the insulating housing 10, an ejector and a shell 30 for covering the housing 10.

Figure 1:
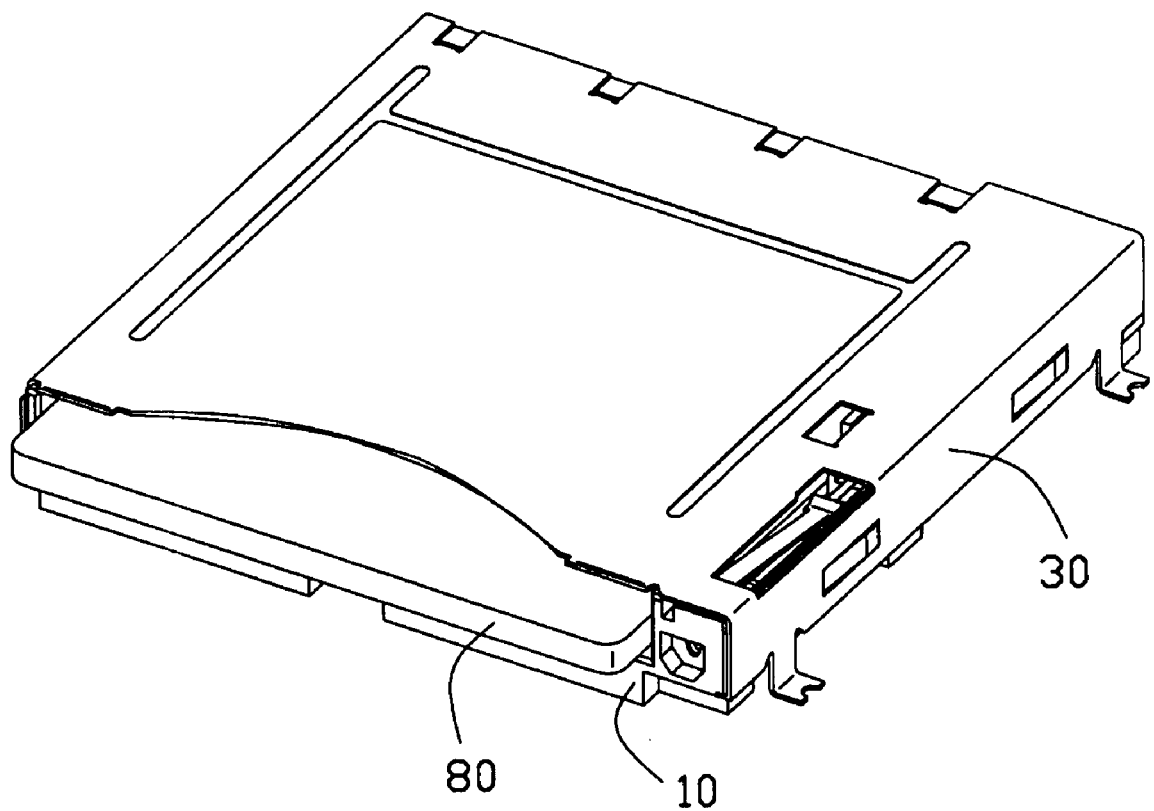
FIG. 1 is an assembled, perspective view of a card connector in accordance with the present invention with a card accommodated therein.
Figure 2:
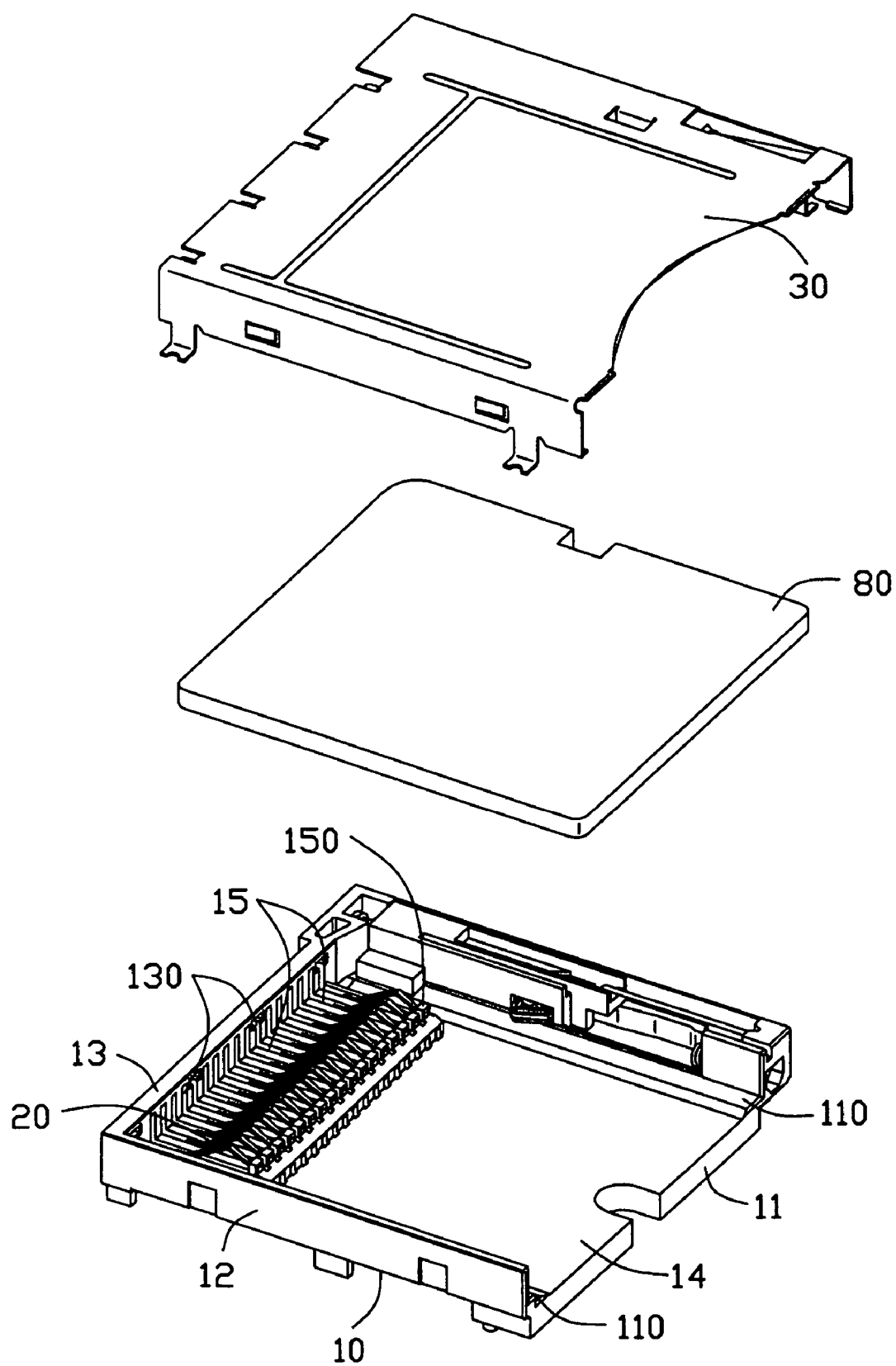
FIG. 2 is a partially exploded, perspective view of the card connector of FIG. 1, with a shell and the card detached from an insulating housing and an ejector in a final position in the insulating housing.

Referring to FIG. 2, the insulating housing 10 is approximately frame configuration. The housing 10 comprises a bottom wall 11, a pair of opposite right and left sidewalls 12 and a rear wall 13, which commonly define a card receiving space 14 for accommodating the card 80. The bottom wall 11 is formed with a plurality of passages 15 arranged side by side along a transverse direction on rear end thereof adjacent to the rear wall 13 and a pair of step portions 110 located on opposite lateral sides thereof adjacent to the opposite sidewalls 12 and extending along a card insertion/ejection direction perpendicular to the transverse direction. The passages 15 extend rearward from the bottom wall 11 through the rear wall 13 to define a plurality of slots 130 in the rear wall 13 and formed with a plurality of apertures 150 at front ends thereof. In addition, a plurality of positioning blocks 118 are formed on a lower face of the bottom wall 11 (referring to FIG. 6). The opposite side walls 12 are respectively formed with cuts 121 and protruding blocks 122 (referring to FIG. 3) on outsides thereof for mating with the shell 30.

Figure 3:
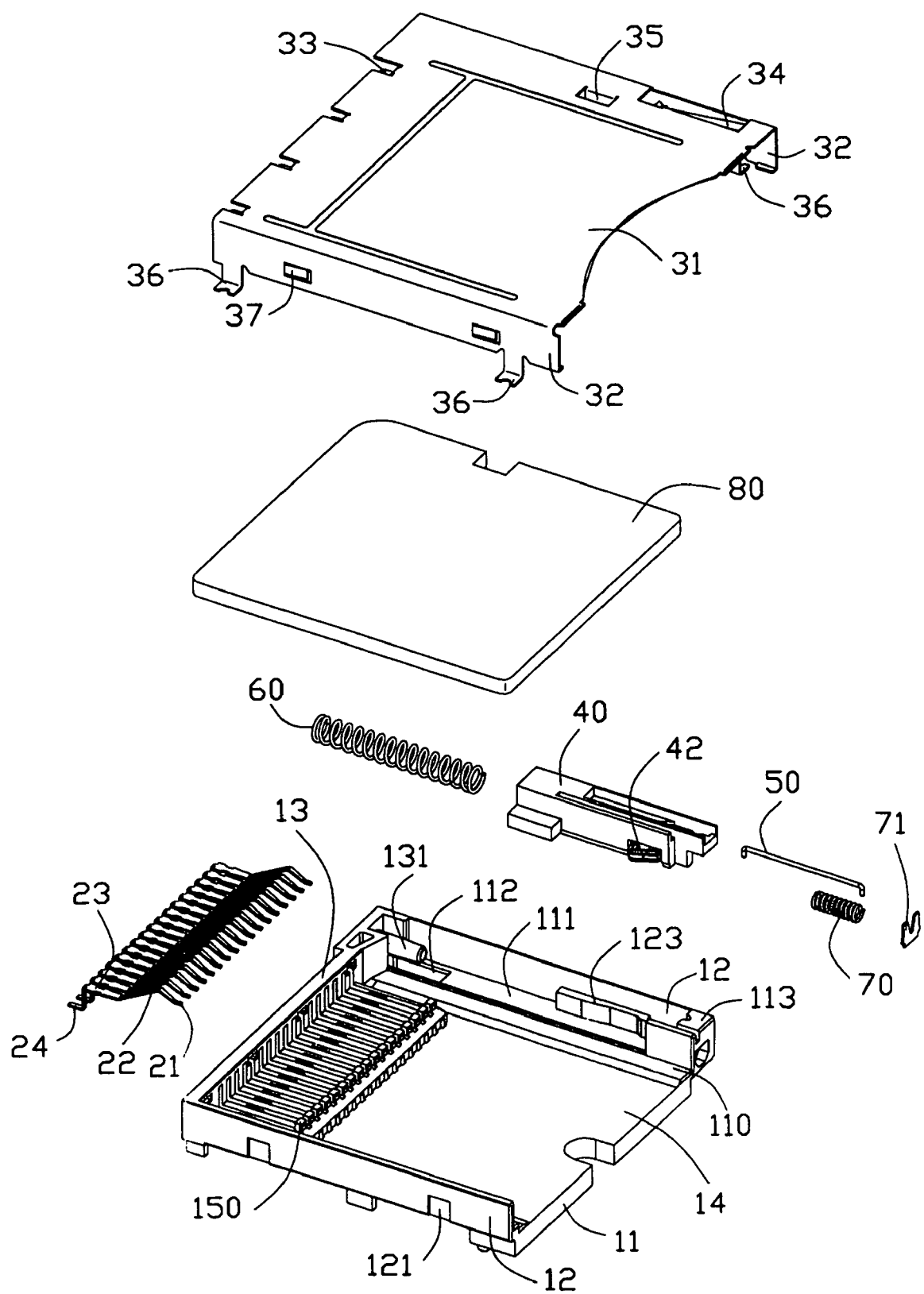
FIG. 3 is an exploded, perspective view of the card connector of FIG. 1.

Referring to FIG. 3, each contact 2 comprises a flat holding portion 23, a contacting portion 22 bended upward from the flat holding portion 23 and a vertical-type soldering portion 24 downwardly extending from the flat holding portion 23. The flat holding portion 23 is secured in the passage 15 and the soldering portion 24 extends from the holding portion 23 through the slot 130 to expose outside the rear wall 13 of the insulating housing 10. The contacting portion 22 is exposed into the card receiving space 14 and a free end 21 thereof is held in the corresponding aperture 150 of the passage 15.

Figure 4:
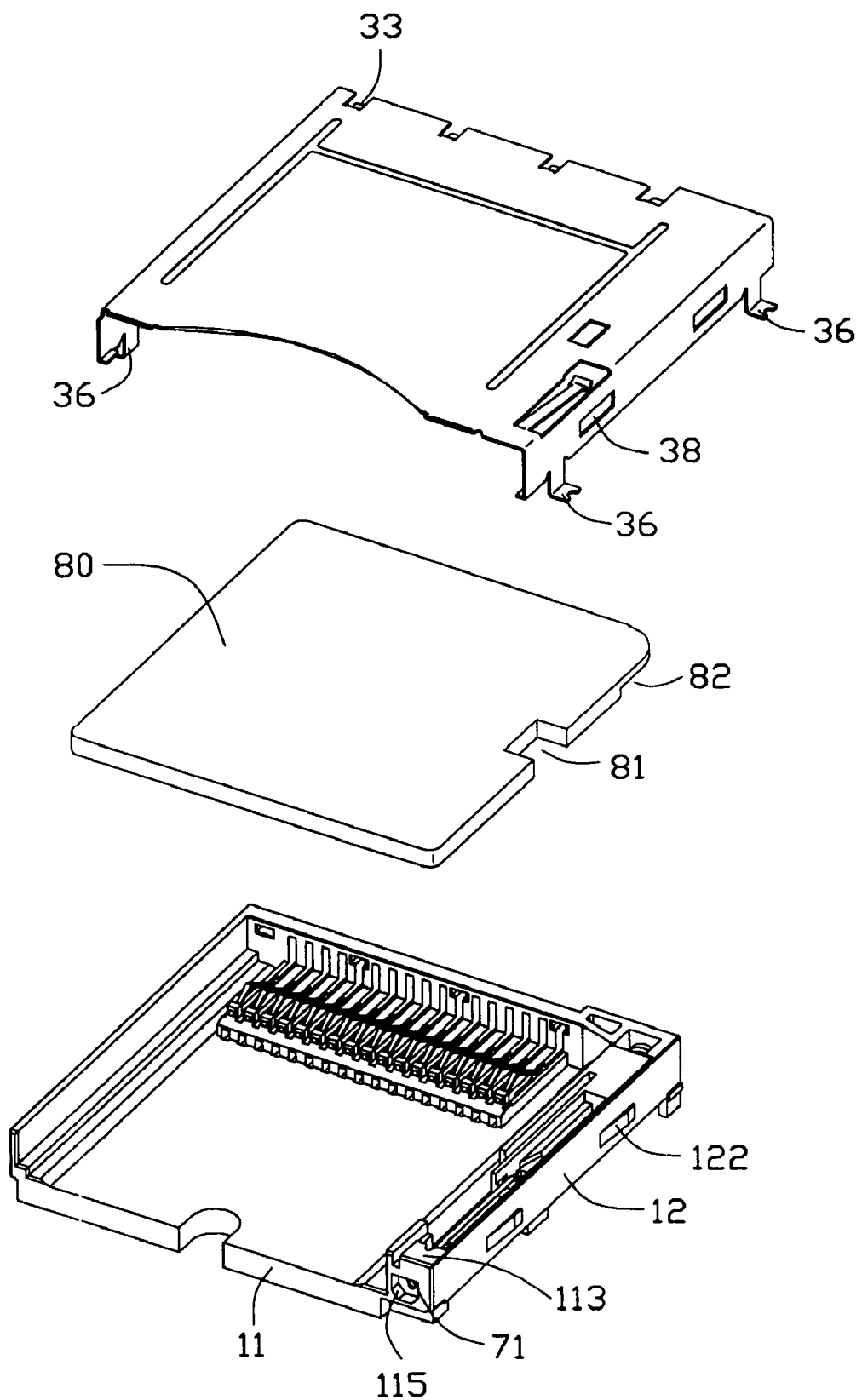
FIG. 4 is a perspective view similar to FIG. 2, but taken from another aspect.

Referring to FIGS. 3 and 4, the shell 30 is made of a metal sheet to cover on the housing 10. The shell 30 comprises a base portion 31 and a pair of opposite right and left side portions 32 extending downward from lateral sides of the base portion 31. Each side portion 32 is formed with a pair of soldering feet 36 on opposite distal ends along the card insertion direction for being mounted on a printed circuit board (not shown). The left side portion 32 is further provided with protruding pieces 37 interferencely received in the cuts 121 of the housing 10, while the right side portion 32 defines a pair of notches 38 accepting the protruding blocks 122. The base portion 31 is also formed with a plurality of holding pieces 33 on rear end thereof arranged along the transverse direction to hold in some slots 130 of the rear wall 13 so as to hold the shell 30 on the housing 10 securely. In addition, the base portion 31 has a resilient piece 34 and a blocking piece 35 both protruding downward into the card receiving space 14 on front end thereof adjacent to the right side portion 32 along the card insertion direction.

Figure 5:
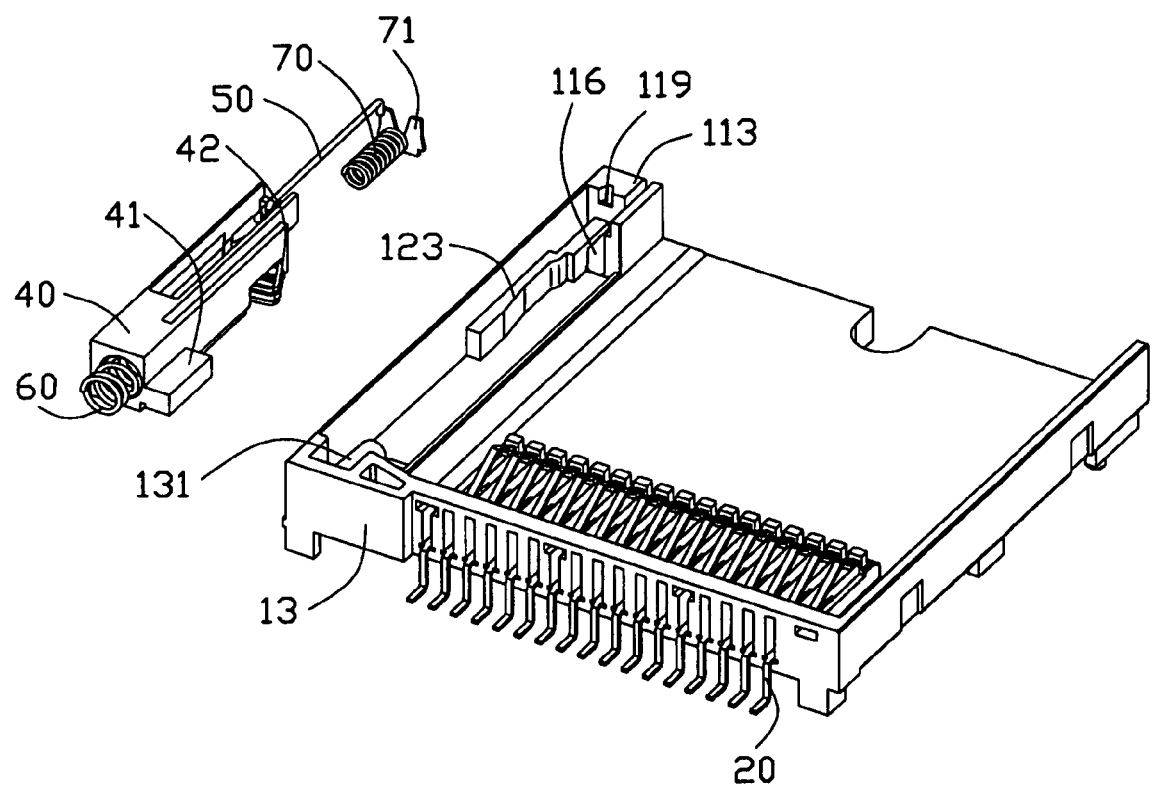
FIG. 5 is a partially exploded, perspective view of FIG. 2 with the ejector detached from the insulating housing.
Figure 6:
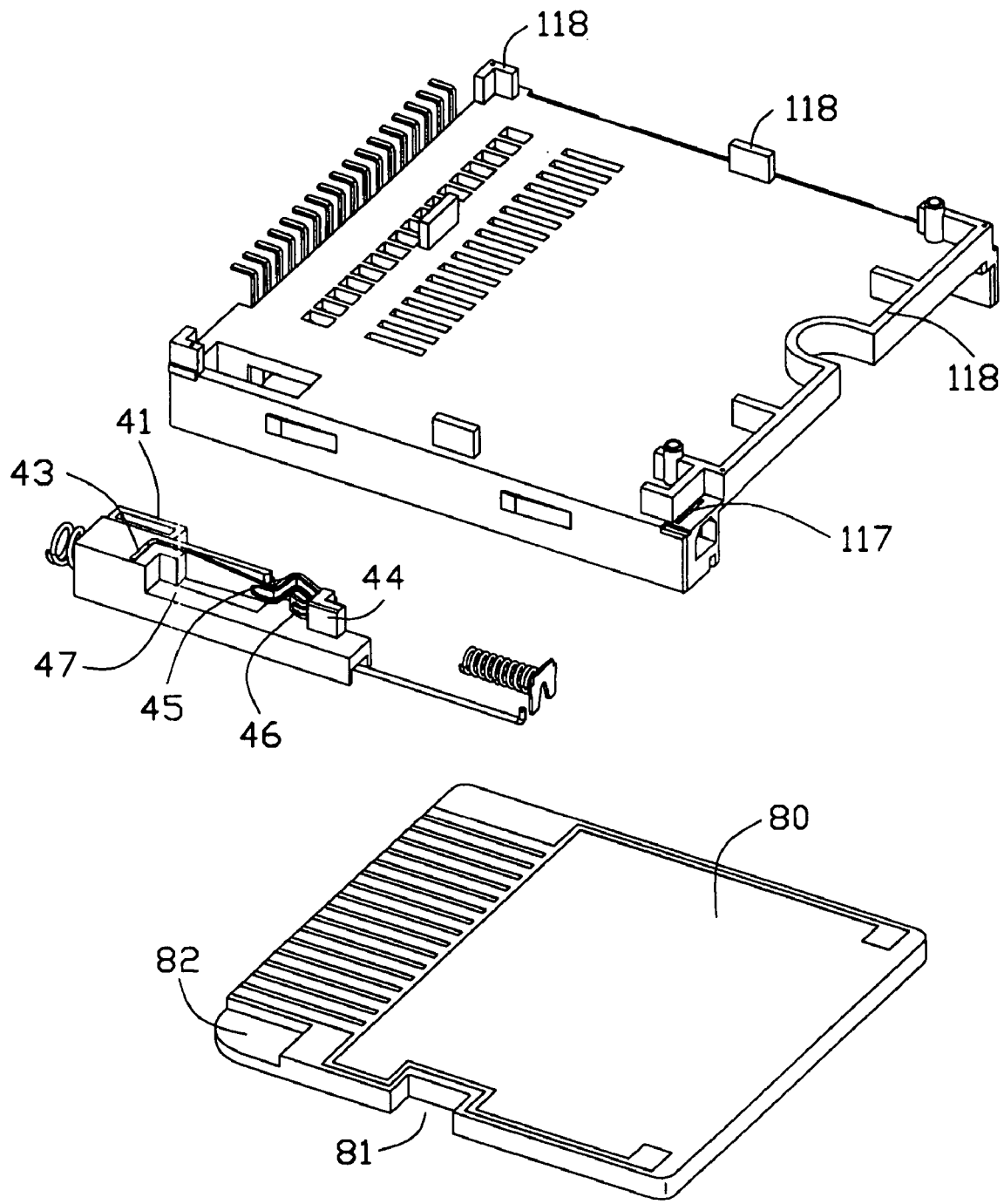
FIG. 6 is an exploded, perspective view of FIG. 2 with the shell not illustrated and taken from another aspect.

Referring to FIGS. 3, 5 and 6, the right sidewall 12 of the housing 10 defines a rectangular cavity 111 communicating with the card receiving space 14 along the card insertion direction for accommodating the ejector. A column 131 protrudes forwardly from the rear wall 13 and is exposed into the cavity 111. A downwardly recessed hole 112 is formed on the bottom wall 11 in alignment with the column 131. The right sidewall 12 has a blocking wall 113 disposed and blocked in front of the cavity 111 at a front end thereof. The blocking wall 113 defines a polygonal concave 115 at a front end thereof and a through hole (not shown) extending rearward from a bottom face of the concave 115 through the blocking wall 113 to define an opening 116 to communicate with the cavity 111 along the card insertion direction. A locking slot 117 is disposed in the blocking wall 113 along a vertical direction and located between the concave 115 and the through hole of the blocking wall 113. The housing 10 is provided with an engaging portion 123 disposed at corner of the cavity 111 apart away from the card receiving space 14. In preferred embodiment of the present invention, the engaging portion 123 is a protruding rib not only used for achieving object of the present invention but also used for enhancing intensity of the right sidewall 12. A front end of the engaging portion 123 is located besides the opening 116 and assembled to the blocking wall 113. Thickness of the engaging portion 123 toward the card receiving space 14 increases little by little along the card insertion direction.

The ejector is used for ejecting the card 80 out of the card connector. The ejector comprises a slider 40 disposed into the cavity 111 of the right sidewall 12, a first spring 60, a second spring 70, a pin member 50 and a restraining piece 71. One end of the first spring 60 is dispose around the column 131 and the other end is disposed into a receiving hole (not shown) of the slider 40 recessed forwardly from a rear face of the slider 40. The second spring 70 is fitly and securely received in the through hole of the blocking wall 113 of the right sidewall 12 and the restraining piece 71 is locked in the locking slot 117 thereof to restrain a front end of the second spring 70 to move forward. Opposite end of the second spring 70 is exposed into the opening 116 of the right sidewall 12. One end of the pin member 50 is moveably disposed in a hear-shaped slot (not shown) of the slider 40 recessed downwardly from a top face of the slider 40 with the help of the resilient piece 34 of the shell 30 pressing downwardly against the pin member 50, and the other end is securely locked in a pinhole 119 of the blocking wall 113 of the right sidewall 12. The pin member 50 and the hear-shaped slot are referred as holding means and can hold the slider 40 in a final position where the card 80 is electrically connected with the card connector and can release the slider 40 when ejecting the card.

The slider 40 is approximately an elongate cube configuration and can move along the card insertion and ejection direction with the card 80 inserted and ejected. The slider 40 comprises an ejecting portion 41 protruding from a rear end thereof into the card receiving space 14 and a locking member 42 disposed in the slider 40. The slider 40 defines a gap 47 on a bottom face thereof and formed with a protruding portion 44 in front of the gap 47 adjacent to the card receiving space 14. The locking member 42 is made of metal rod and one end thereof is secured in a receiving slot 43 formed on the bottom face of the slider 40. Opposite end of the locking member 42 extends forward into the gap 47 and is bent to form a locking portion 45 resiliently protruding into the card receiving space 14 and a bended positioning portion 46 extending from the locking portion 45 and resiliently exposed into the gap 47.

When the slider 40 is assembled in the cavity 111 of the right sidewall 12, the engaging portion 123 is received in the gap 47 besides the positioning portion 46 of the locking member 42.

The card 80 is formed with a cut 81 at right side thereof and a notch 82 defined in a lower face of a corner between a front end and the right side thereof. In process of the card 80 inserted into the card connector, the card 80 moves rearward along the slider 40, the right side thereof firstly urges the locking portion 45 of the locking member 42 to fully move into the gap 47 of the slider 40. Then, continuing to move the card 80, when the locking portion 45 faces to the cut 81 of the card 80, the locking portion 45 protrudes into the cut 81 because of elasticity itself. At this time, the notch 82 collides with the ejecting portion 41 of the slider 40 and pushes the slider 40 to move rearward along the card insertion direction and presses the first spring 60. On the other hand, the positioning portion 46 of the locking member 42 moves rearward opposite to the engaging portion 123 received in the gap 47 of the slider 40. Because the thickness of the engaging portion 123 increases along the card insertion direction, therefore, when the card 80 is in the final position where the card 80 is electrically connected with the card connector, the positioning portion 46 of the locking member 42 abuts tightly against a rear end of the engaging portion 123 to urge the locking portion 45 to securely and tightly lock into the cut 81 of the card 80.

In such situation, even if the card 80 is exerted an outer force by mistake, it is impossible to be drawn away from the card connector because the engaging portion 123 abuts tightly against the positioning portion 46 to force the locking portion 45 of the locking member 42 to securely lock into the cut 81 of the card 80, and to prevent the locking portion 45 from leaving from the cut 81 of the card 80 to move into the gap 47 of the slider 40.

When the card 80 is pushed by a rearward force, the card 80 is ejected from the card connector. The resilient restorable force of the first spring 60 forces the slider 40 to move forward and the locking member 42 moves with the slider 40. The positioning portion 46 of the locking member 42 detaches from the engaging portion 123 little by little to make the locking portion 45 leave the cut 81 slowly because of different thickness of the engaging portion 123, thus, avoiding the card 80 to be ejected out speedily so as to hurt the user. On the other hand, when the slider 40 continues to move forward, the protruding portion 44 thereof will collide with the second spring 70 partly exposed in the opening 116 of the right sidewall 12 to buffer the slider 40 with the restraining piece 71 blocking the front end of the second spring 70.

While a preferred embodiment in accordance with the present invention has been shown and described, equivalent modifications and changes known to persons skilled in the art according to the spirit of the present invention are considered within the scope of the present invention as described in the appended claims.

What is claimed is:

1. A card connector adapted for receiving a card, comprising:
an insulating housing defining a card receiving space with a card insertion/ejection direction;
a plurality of contacts retained in the insulating housing and exposed into the card receiving space;
an ejector disposed in the housing comprising a slider moving along the card insertion/ejection direction with the card inserted/ejected, holding means to securely hold the slider in a final position where the card is electrically connected with the contacts and to release the slider from the final position when ejecting the card, and a locking member disposed in the slider to be moveable in or out of the card receiving space; and
an engaging portion disposed in the insulating housing adjacent to the slider of the ejector, and the engaging portion cooperating with the locking member to securely lock the card in the final position.

2. The card connector as described in claim 1, wherein thickness of the engaging portion increases toward the card receiving space along the card insertion direction.

3. The card connector as described in claim 1, wherein the holding means comprises a pin member and a hear-shaped slot disposed in the slider, and wherein one end of the pin member assembled to the insulating housing and the other end is moveably disposed in the hear-shaped slot.

4. The card connector as described in claim 1, wherein the housing comprises a pair of step portions on lateral sides of a bottom wall of the housing adjacent to a pair of opposite sidewalls thereof along the card inserting direction.

5. The card connector as described in claim 1, wherein the engaging portion is integrated with the housing.

6. The card connector as described in claim 5, wherein the engaging portion is a rib on a sidewall of the housing to enhance intensity of the sidewall.

7. The card connector as described in claim 1, wherein the slider defines a gap thereon, and wherein the locking member is received in the gap and comprises a protruding portion protruding into the card receiving space and the protruding portion can move in/out of the gap.

8. The card connector as described in claim 7, wherein the engaging portion is accommodated in the gap of the slider.

9. The card connector as described in claim 1, wherein the ejector comprises a first spring, and wherein one end of the first spring is assembled to a rear wall of the insulating housing and the other end is disposed in the slider so as to resiliently urge the slider to move along the card ejection direction.

10. The card connector as described in claim 9, wherein the ejector comprises a second spring disposed in a front end of the insulating housing opposite to the slider.

11. The card connector as described in claim 10, wherein the ejector comprises a restraining piece disposed in front of the second spring in the housing.

12. The card connector as described in claim 1, further comprising a shell covering the insulating housing.

13. The card connector as described in claim 12, wherein the shell is formed with a base portion and the base portion comprises a holding piece at rear end thereof, and wherein the insulating housing comprises a rear wall formed with a slot for receiving the holding piece of the shell therein.

14. A card connector comprising:
an insulative housing defining a card receiving cavity;
a plurality of contacts disposed in the housing with contact portions in communication with the card receiving cavity;
an ejector disposed in the housing comprising a slider moving along the card insertion/ejection direction with the card inserted/ejected, holding means to securely hold the slider in a final position where the card is electrically connected with the contacts and to release the slider from the final position when ejecting the card, and a locking member disposed in the slider to be moveable in or out of the card receiving space; and
a primary biasing device located around a rear portion of the housing to generate required forces for ejection of the card, and a secondary biasing device located around a front portion of the housing for counterbalancing the forces generated by the primary biasing device during card ejection.

* * * * *